US011545797B2

(12) United States Patent
Huang et al.

(10) Patent No.: US 11,545,797 B2
(45) Date of Patent: Jan. 3, 2023

(54) POWER CONNECTOR SOCKET (71) Applicant: ADVANCED-CONNECTEK INC., New Taipei (TW)

(72) Inventors: Sheng-Hsiang Huang, New Taipei (TW); Yu-Feng Ke, New Taipei (TW)

(73) Assignee: ADVANCED-CONNECTEK INC., New Taipei (TW)

( * ) Notice: Subject to any disclaimer, the term of this patent is extended or adjusted under 35 U.S.C. 154(b) by 56 days.

(21) Appl. No.: 17/192,314

(22) Filed: Mar. 4, 2021

(65) Prior Publication Data
US 2021/0281028 A1    Sep. 9, 2021

(30) Foreign Application Priority Data
Mar. 5, 2020   (TW) .................................. 109202471

(51) Int. Cl.
*H01R 24/86* (2011.01)
*H01R 24/58* (2011.01)
*H01R 13/11* (2006.01)

(52) U.S. Cl.
CPC ............. *H01R 24/86* (2013.01); *H01R 13/11* (2013.01); *H01R 24/58* (2013.01); *H01R 2201/26* (2013.01)

(58) Field of Classification Search
CPC ........ H01R 24/86; H01R 13/11; H01R 24/58; H01R 2201/26
USPC ....................................................... 439/668
See application file for complete search history.

(56) References Cited

U.S. PATENT DOCUMENTS

| | | | | |
|---|---|---|---|---|
| 4,299,431 A | * | 11/1981 | Wilson ................. | H01R 13/523 439/205 |
| 5,667,413 A | * | 9/1997 | Trafton ................ | H01R 13/187 439/271 |
| 6,042,432 A | * | 3/2000 | Hashizawa .......... | H01R 13/187 439/843 |
| 6,062,919 A | * | 5/2000 | Trafton ................ | H01R 13/187 439/843 |
| 6,186,841 B1 | * | 2/2001 | Jacobsson ............. | H01R 13/111 439/856 |
| 6,250,974 B1 | * | 6/2001 | Kerek .................. | H01R 13/187 439/843 |
| 6,273,766 B1 | * | 8/2001 | Zennamo, Jr ........ | H01R 13/187 439/843 |
| 6,296,519 B1 | * | 10/2001 | Hashizawa ........ | H01R 13/6599 439/607.42 |

(Continued)

*Primary Examiner* — Alexander Gilman
(74) *Attorney, Agent, or Firm* — Muncy, Geissler, Olds & Lowe, P.C.

(57) ABSTRACT

A power connector socket includes a housing and a lamella cage. The housing includes a socket and an opening at a side portion of the socket. The lamella cage passes through the socket and includes a ring portion and contact lamellae. The ring portion is adjacent to the opening. The contact lamellae outwardly extend from a side portion of the ring portion and are annularly arranged. One of two ends of each of the contact lamellae includes a fixed end formed on the ring portion, and a free end outwardly extends from the other end of each of the contact lamellae. The contact lamellae include contact portions extending toward an interior portion of the socket. The contact portions are a first position adjacent to the fixed end of each of the contact lamellae and on a second position of a middle portion of each of the contact lamellae.

17 Claims, 13 Drawing Sheets

(56) References Cited

U.S. PATENT DOCUMENTS

| | | | | |
|---|---|---|---|---|
| 8,096,829 | B2* | 1/2012 | Malloy | H01R 9/05 |
| | | | | 439/578 |
| 8,303,352 | B2* | 11/2012 | Hangartner | H01R 13/187 |
| | | | | 439/852 |
| 8,851,940 | B2* | 10/2014 | Friedhof | H01R 13/111 |
| | | | | 439/843 |
| 8,858,264 | B2* | 10/2014 | Mott | H01R 13/42 |
| | | | | 439/660 |
| 8,876,562 | B2* | 11/2014 | Glick | H01R 13/187 |
| | | | | 439/843 |
| 9,236,682 | B2* | 1/2016 | Glick | H01R 13/62 |
| 9,257,769 | B2* | 2/2016 | Ito | H01R 13/02 |
| 9,601,856 | B2* | 3/2017 | Regantini | H01R 13/18 |
| 10,135,167 | B2* | 11/2018 | Wollitzer | H01R 13/187 |
| 2009/0298356 | A1* | 12/2009 | Li | H01R 13/33 |
| | | | | 439/843 |
| 2011/0028051 | A1* | 2/2011 | Heigl | H01R 13/111 |
| | | | | 439/736 |
| 2014/0099843 | A1* | 4/2014 | Ito | H01R 13/187 |
| | | | | 439/884 |
| 2016/0211590 | A1* | 7/2016 | Saur | H01R 13/187 |
| 2017/0250503 | A1* | 8/2017 | Hopf | H01R 13/53 |
| 2018/0248290 | A1* | 8/2018 | Wollitzer | H01R 13/187 |
| 2019/0027853 | A1* | 1/2019 | Ungere | H01R 13/187 |
| 2019/0027857 | A1* | 1/2019 | Narberhaus | H01R 13/6591 |
| 2021/0005995 | A1* | 1/2021 | Mangstl | H01R 13/111 |
| 2021/0281000 | A1* | 9/2021 | Huang | H01R 13/50 |
| 2021/0281028 | A1* | 9/2021 | Huang | H01R 24/58 |
| 2021/0399456 | A1* | 12/2021 | Brand | H01R 13/18 |

\* cited by examiner

POWER CONNECTOR SOCKET

CROSS-REFERENCE TO RELATED APPLICATION

This non-provisional application claims priority under 35 U.S.C. § 119(a) to Patent Application No. 109202471 filed in Taiwan, R.O.C. on Mar. 5, 2020, the entire contents of which are hereby incorporated by reference.

FIELD OF THE INVENTION

The instant disclosure relates to a power connector, and more particular to a power connector socket.

BACKGROUND

The battery of the electric vehicle can be charged by inserting an electrical plug connector into the electrical receptacle connector in the electric vehicle. The electrical plug connector has a standardized shape and five housings. Therefore, the electrical receptacle connector on the electric vehicle and the electrical plug connector of the charging gun at the charging station are mated with each other and connected to each other. Specifically, the five conductive bodies (pins) of the electrical plug connector are respectively two AC power pins, a ground pin, a proximity detection pin, and a pilot control pin.

The electrical receptacle connector has a socket, and crown pin is inserted into and fixed in the socket. Conversely, the electrical plug connector has an insertion pin for being inserted into the socket and being partly contacting the lamella cage. Hence, the electrical connection between the electrical receptacle connector and the electrical plug connector can be achieved through the lamella cage.

SUMMARY OF THE INVENTION

A lamella cage known to the inventor is formed by winding a metallic sheet into a C-shaped structure, and the side portion of the C-shaped structure forms an opening. Another lamella cage known to the inventor has two ring portions and a plurality of contact lamellae connecting between the two ring portions, lamella cages mostly are of waist drum configurations; that is, the diameter of two ends of the lamella cage is longer while the diameter of the middle portion of the lamella cage is shorter. The lamella cage has several contact lamellae. The contact lamella may be formed as a linear structure or a spiral structure (also called torsion spring). Hence, the structure of the lamella cage is complicated and the manufacturing cost for the crown is increased. Furthermore, slots are formed between the contact lamellae, and the widths of adjacent contact lamellae (fences) are different. Consequently, first, the shortest contact position of the lamella cage (the contact for the insertion of the electrical plug connector) is located at the lamella cage by a range from one-third of the entire length of the lamella cage to one-second of the entire length of the lamella cage, and the distance between the end portion of the lamella cage and the position of the contact position cannot be reduced anymore. Second, the size of the internal frame of the lamella cage cannot be controlled properly. As a result, when the insertion pin of the electrical plug connector is inserted into the socket of the electrical receptacle connector, the insertion-pulling force may be excessive.

One embodiment of the instant disclosure provides a power connector socket. The power connector comprises a housing and a lamella cage. The housing comprises a socket and an opening at a side portion of the socket. The lamella cage passes through the socket. The lamella cage comprises a ring portion and a plurality of contact lamellae. The ring portion is adjacent to the opening. The contact lamellae outwardly extend from a side portion of the ring portion and are annularly arranged. One of two ends of each of the contact lamellae comprises a fixed end formed on the ring portion, and a free end outwardly extends from the other end of each of the contact lamellae. The contact lamellae comprise a plurality of contact portions extending toward an interior portion of the socket. The contact portions are on a first position adjacent to the fixed end of each of the contact lamellae and on a second position of a middle portion of each of the contact lamellae.

In one or some embodiments, the contact lamellae comprise a plurality of long suspension arms and a plurality of short suspension arms. The long suspension arms and the short suspension arms are alternately and spacedly arranged and extending outwardly from the side portion of the ring portion.

In one or some embodiments, the contact portions comprise a plurality of first contacts and a plurality of second contacts. The first contacts are at the first positions of the short suspension arms, and the second contacts are at the second positions of the long suspension arms.

In one or some embodiments, the contact portions comprise a plurality of third contacts, and each of the third contacts is on a third position of the corresponding long suspension arm.

In one or some embodiments, the third position corresponds to the first position or does not correspond to the first position.

In one or some embodiments, each of the contact portions comprises a protruding portion. Each of the protruding portions bends and protrudes toward a center point of the socket from the corresponding contact lamella.

In one or some embodiments, each of the contact portions is located at the lamella cage by a range from one-fifth of the entire length of the lamella cage to one-second of the entire length of the lamella cage.

In one or some embodiments, the lengths of the contact lamellae are the same.

In one or some embodiments, a first contact timing of the lamella cage corresponds to a distance between the opening and the contact portion on the first position, and a second contact timing of the lamella cage corresponds to a distance between the contact portion on the first position and the contact portion on the second position.

In one or some embodiments, the housing comprises an annular slot formed as an inner wall of the socket. The ring portion and the free ends of the contact lamellae are respectively abutted against two ends of the annular slot.

According to one or some embodiments of the instant disclosure, the position of the contact portion (contact) on the contact lamella of the lamella cage can be adjusted freely so as to meet insertion pins with different lengths. Moreover, the configuration of the protruding portion of the contact portion (contact) improves the reliability for being contacted by the insertion pin. Furthermore, since the orientation of the short suspension arm for contacting the insertion pin can be adjusted easily, the mating/unmating force can be controlled properly. Hence, the force for inserting the insertion pin into the receptacle connector (the mating force) is smaller, while the force for pulling the insertion pin out of the receptacle connector (the unmating force) is larger. Furthermore, by having the long suspension arms and the short suspension arms on the ring portion of the socket in an alternate configuration, the normal force for contacting the contact lamellae can be adjusted, thereby increasing the pluggable property and durability of the receptacle connector.

Detailed description of the characteristics and the advantages of the instant disclosure are shown in the following embodiments. The technical content and the implementation of the instant disclosure should be readily apparent to any person skilled in the art from the detailed description, and the purposes and the advantages of the instant disclosure should be readily understood by any person skilled in the art with reference to content, claims, and drawings in the instant disclosure.

BRIEF DESCRIPTION OF THE DRAWINGS

The instant disclosure will become more fully understood from the detailed description given herein below for illustration only, and thus not limitative of the instant disclosure, wherein.

DETAILED DESCRIPTION

Figure 1:
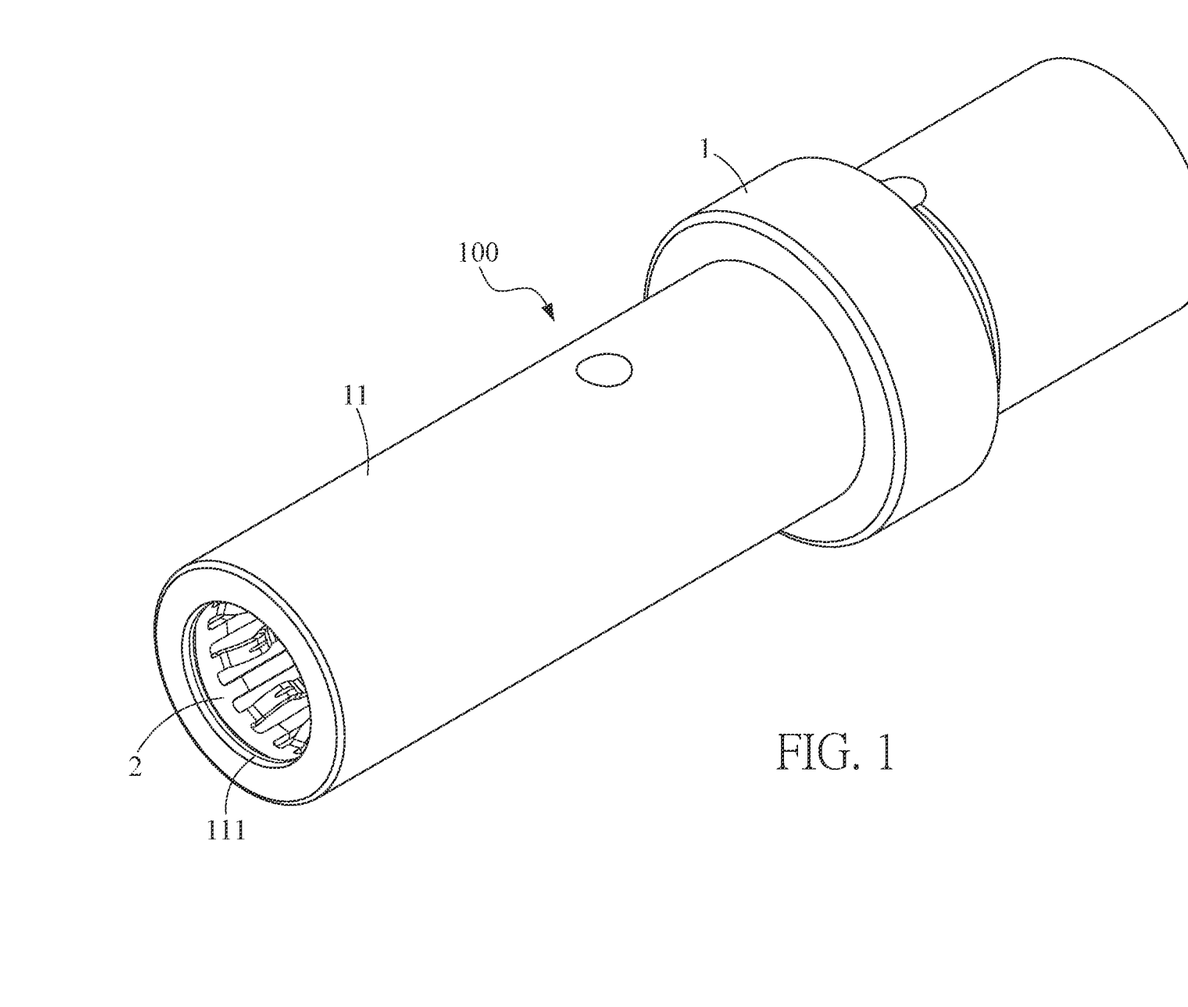
FIG. 1 illustrates a perspective view of a power connector according to a first embodiment of the instant disclosure.
Figure 2:
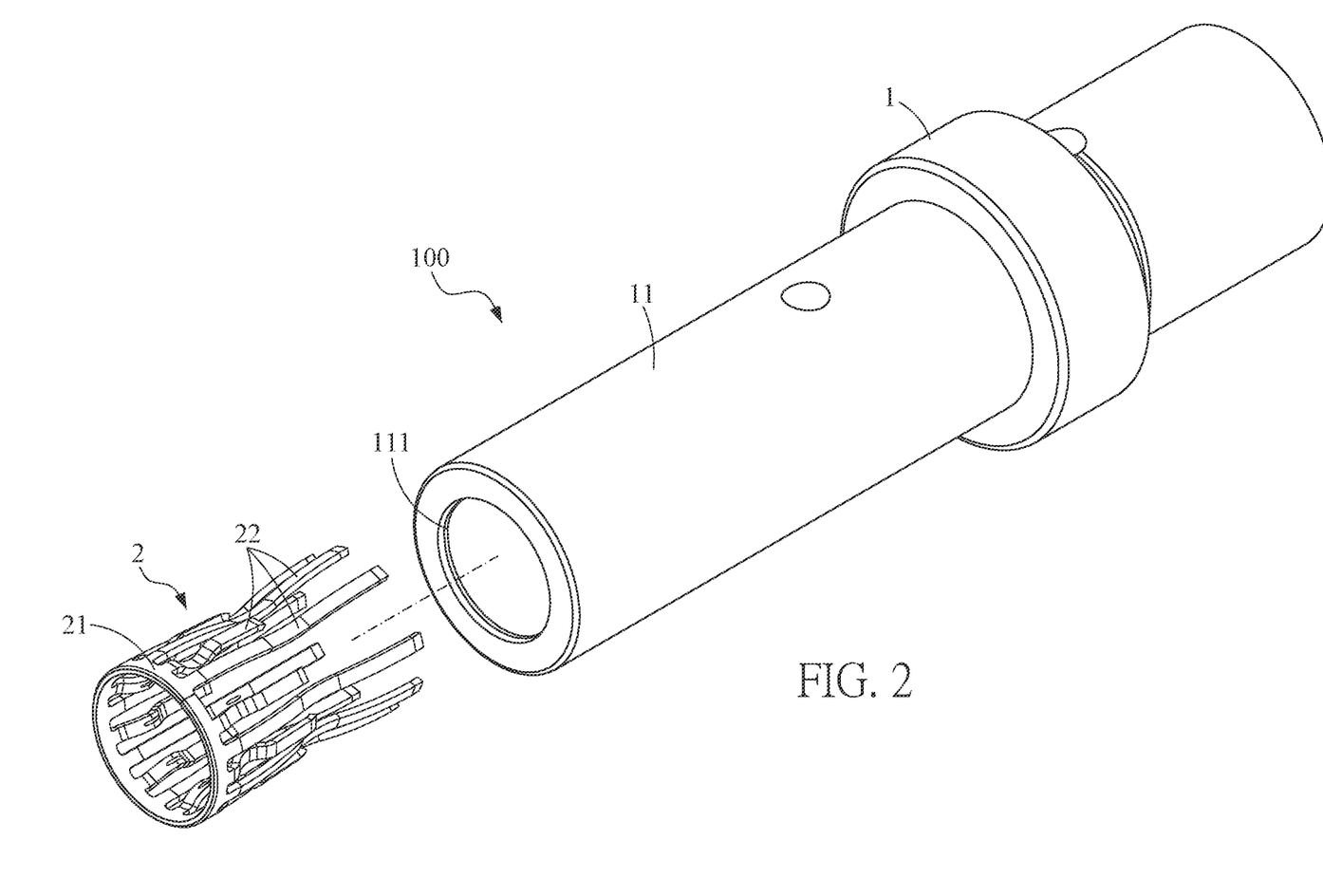
FIG. 2 illustrates an exploded view of the power connector of the first embodiment.
Figure 3:
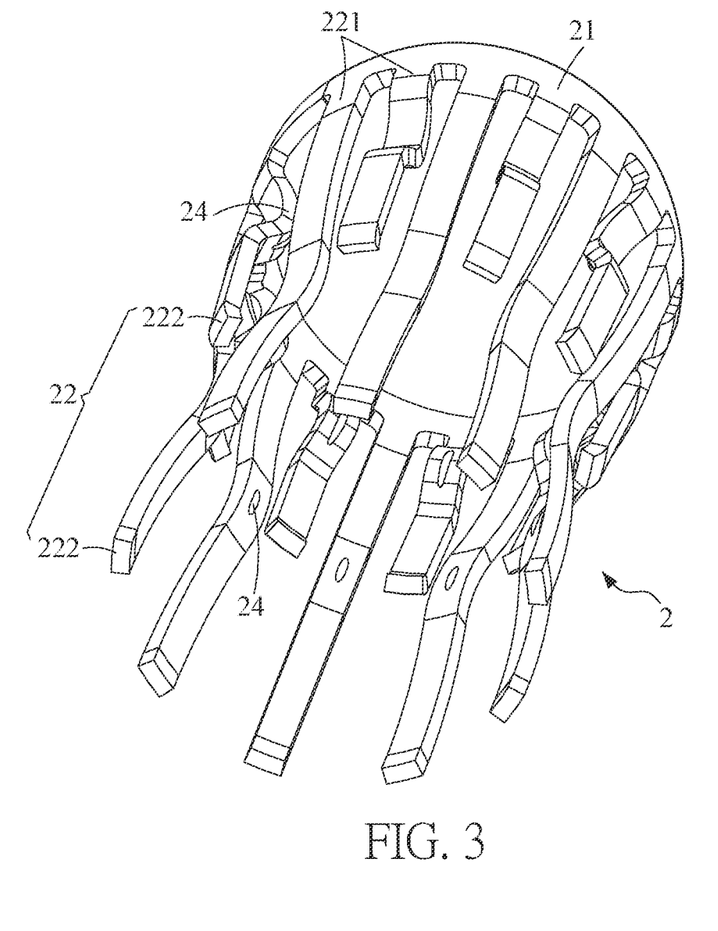
FIG. 3 illustrates a perspective view of a lamella cage of the power connector of the first embodiment.
Figure 4:
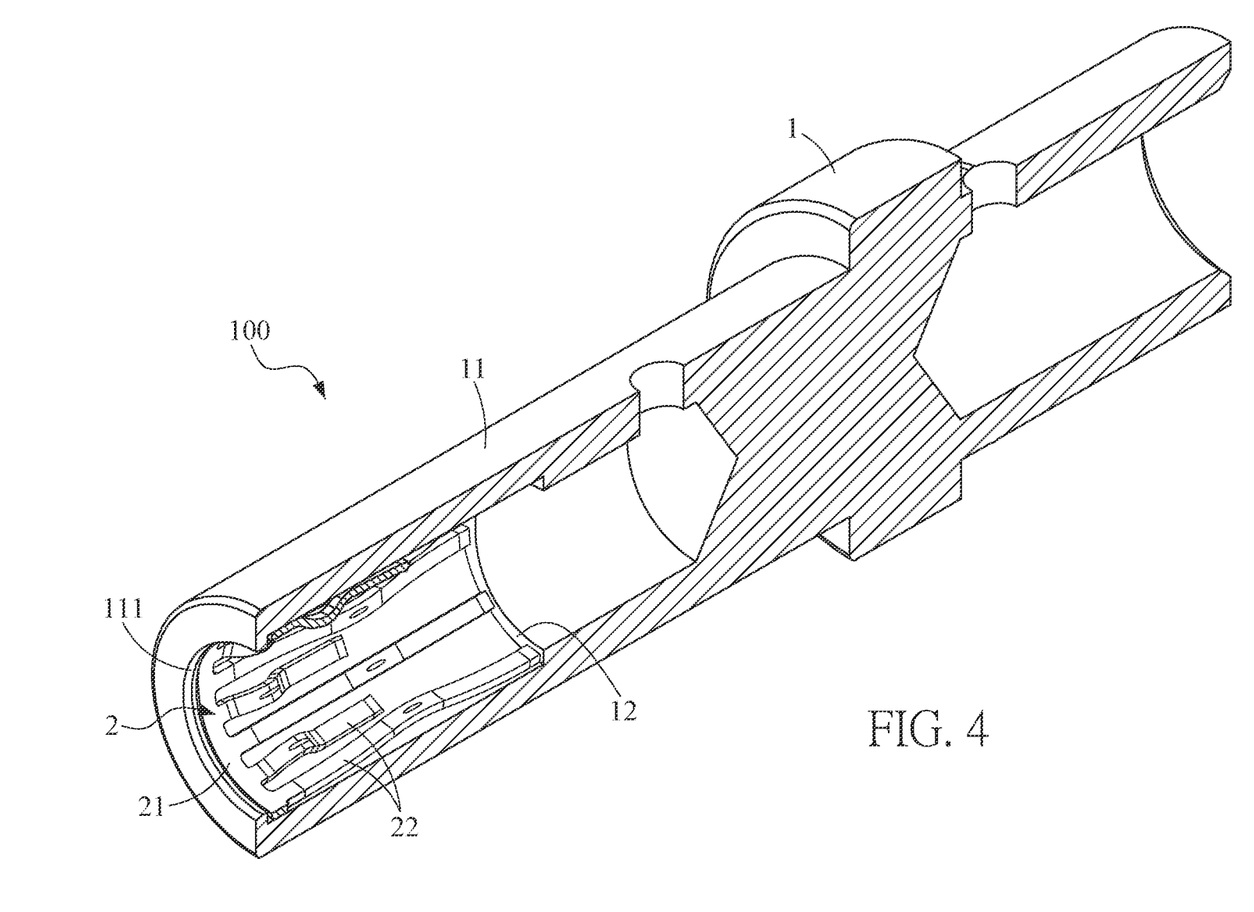
FIG. 4 illustrates a perspective sectional view of the power connector of the first embodiment.
Figure 5:
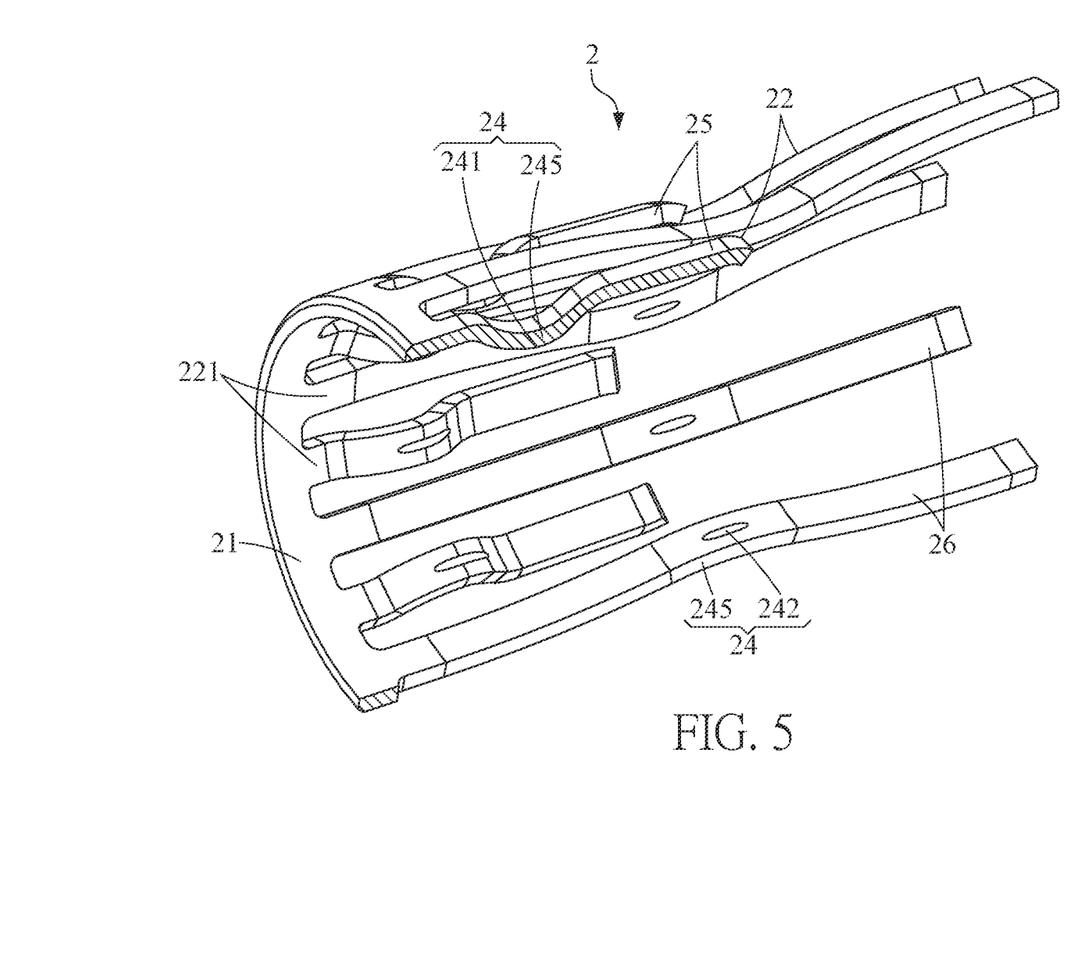
FIG. 5 illustrates a perspective sectional view of the lamella cage of the power connector of the first embodiment.
Figure 6:
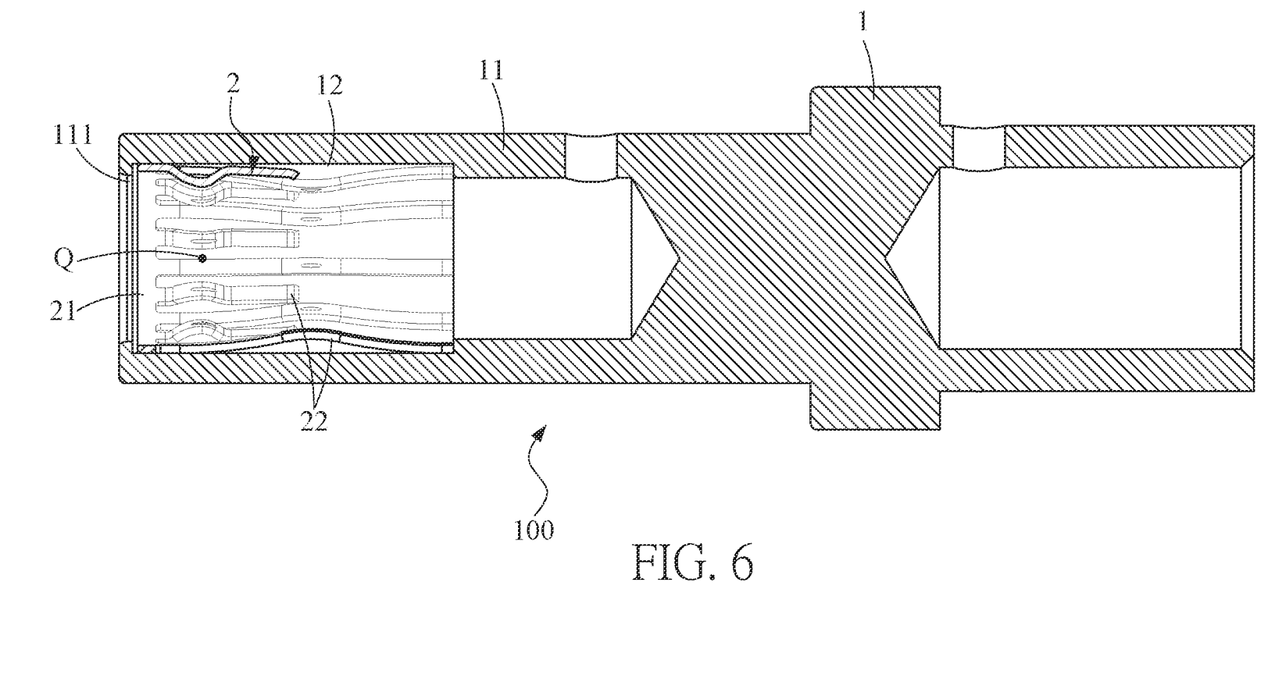
FIG. 6 illustrates a side schematic view of the power connector of the first embodiment.
Figure 7:
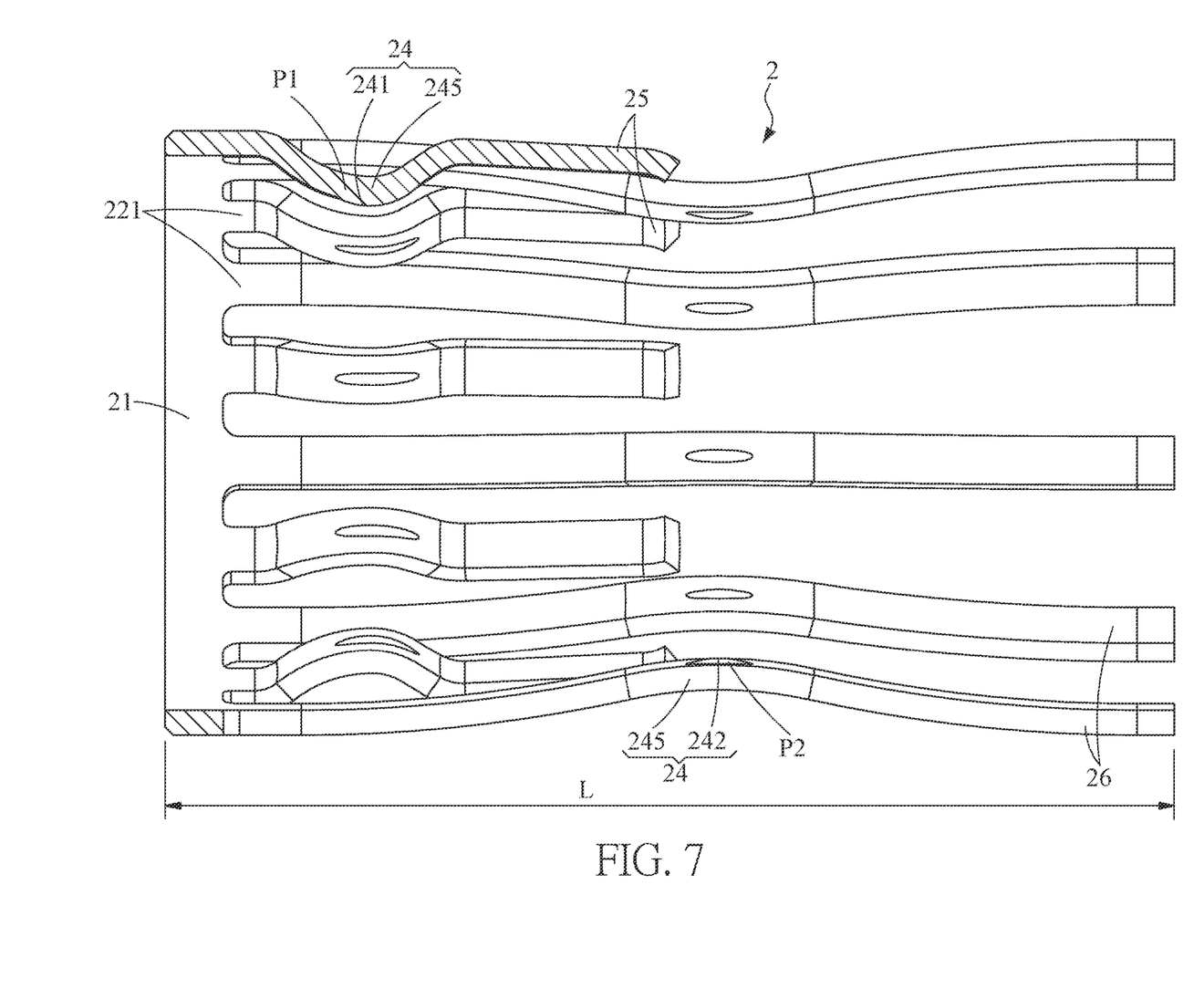
FIG. 7 illustrates a side schematic view of the lamella cage of the power connector of the first embodiment.

Please refer to FIGS. 1 to 5. A power connector according to a first embodiment of the instant disclosure is illustrated. FIG. 1 illustrates a perspective view of a power connector according to a first embodiment of the instant disclosure. FIG. 2 illustrates an exploded view of the power connector of the first embodiment. FIG. 3 illustrates a perspective view of a lamella cage of the power connector of the first embodiment. FIG. 4 illustrates a perspective sectional view of the power connector of the first embodiment. FIG. 5 illustrates a perspective sectional view of the lamella cage of the power connector of the first embodiment. 6 illustrates a side schematic view of the power connector of the first embodiment. FIG. 7 illustrates a side schematic view of the lamella cage of the power connector of the first embodiment.

In this embodiment, the power connector is a receptacle connector 100. The power connector comprises a housing 1 and a lamella cage 2. The power connector may be served as the charging dock of an automobile electrical connector (e.g., electric vehicle, hybrid vehicle, or electric car), but embodiments are not limited thereto; the power connector may be applied in other fields having power transmission needs.

In this embodiment, one end of the housing 1 comprises the socket 11 and an opening 111 at a side portion of the socket 11.

In this embodiment, the lamella cage 2 passes through the socket 11. The lamella cage 2 comprises a ring portion 21 and a plurality of contact lamellae 22. The ring portion 21 is adjacent to the opening 111. The contact lamellae 22 outwardly extend from a side portion of the ring portion 21, and the contact lamellae 22 are annularly arranged on the side portion of the ring portion 21. One of two ends of each of the contact lamellae 22 comprises a fixed end 221 on the ring portion 21 (the material belt), and a free end 222 outwardly extends from the other end of each of the contact lamellae 22. The contact lamellae 22 comprise a plurality of contact portions 24 extending toward an interior portion (e.g., the center point Q) of the socket 11.

In this embodiment, the contact portions 24 are on a first position P1 adjacent to the fixed end 221 of each of the contact lamellae 22 and on a second position P2 of a middle portion of each of the contact lamellae 22.

In this embodiment, more specifically, the first position P1 is defined as a position of the contact lamella 22 adjacent to the fixed end 221 of the contact lamella 22, and the second position P2 is defined as the position of the middle portion of the contact lamella 22. The first position P1 is different from the second position P2. A length from the opening 111 of the socket 11 to the first position P1 is greater than a length from the opening 111 of the socket 11 to the second position P2. The first position P1 is on the portion of the contact lamella 22 adjacent to the opening 111 of the socket 11, and the second position P2 is on the portion of the contact lamella 22 at the inner portion of the socket 11.

In this embodiment, more specifically, the fixed end 221 of one of two ends of each of the contact lamellae 22 is on the ring portion 21, and the free end 222 extends outwardly from the other end of each of the contact lamellae 22, so that a suspension arm structure is formed. Hence, as compared with the configuration known to the inventor, i.e., the lamella cage having two ring portions as well as several contact lamellae connected between the two ring portions, the suspension arm structure of the embodiment(s) can provide a better elastic force.

Figure 12:
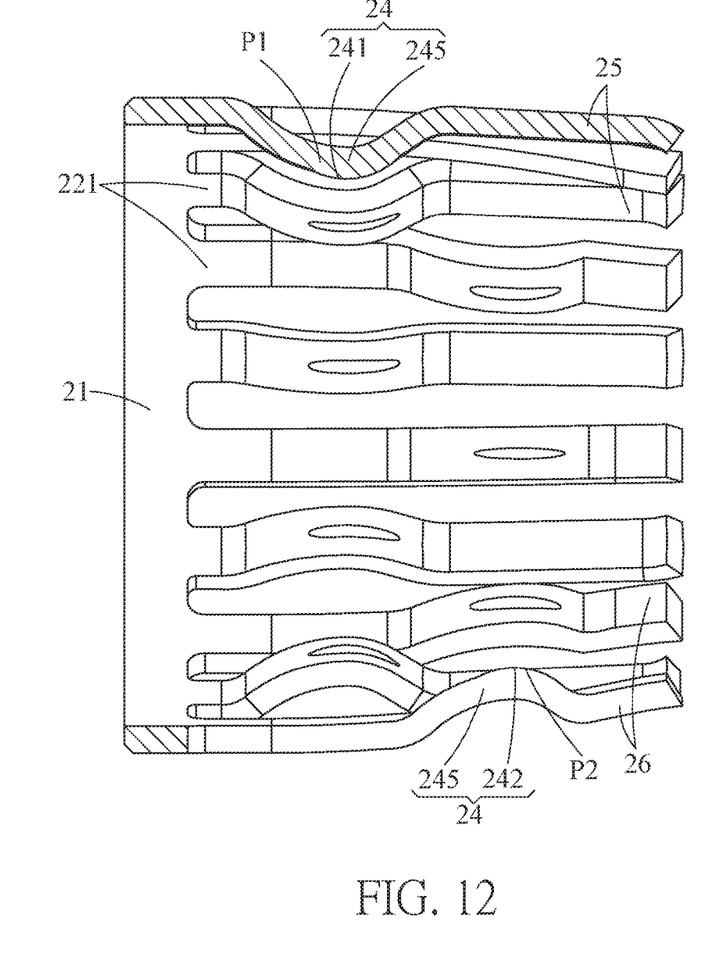
FIG. 12 illustrates a side schematic view of a lamella cage of a power connector according to a third embodiment of the instant disclosure.
Figure 13:
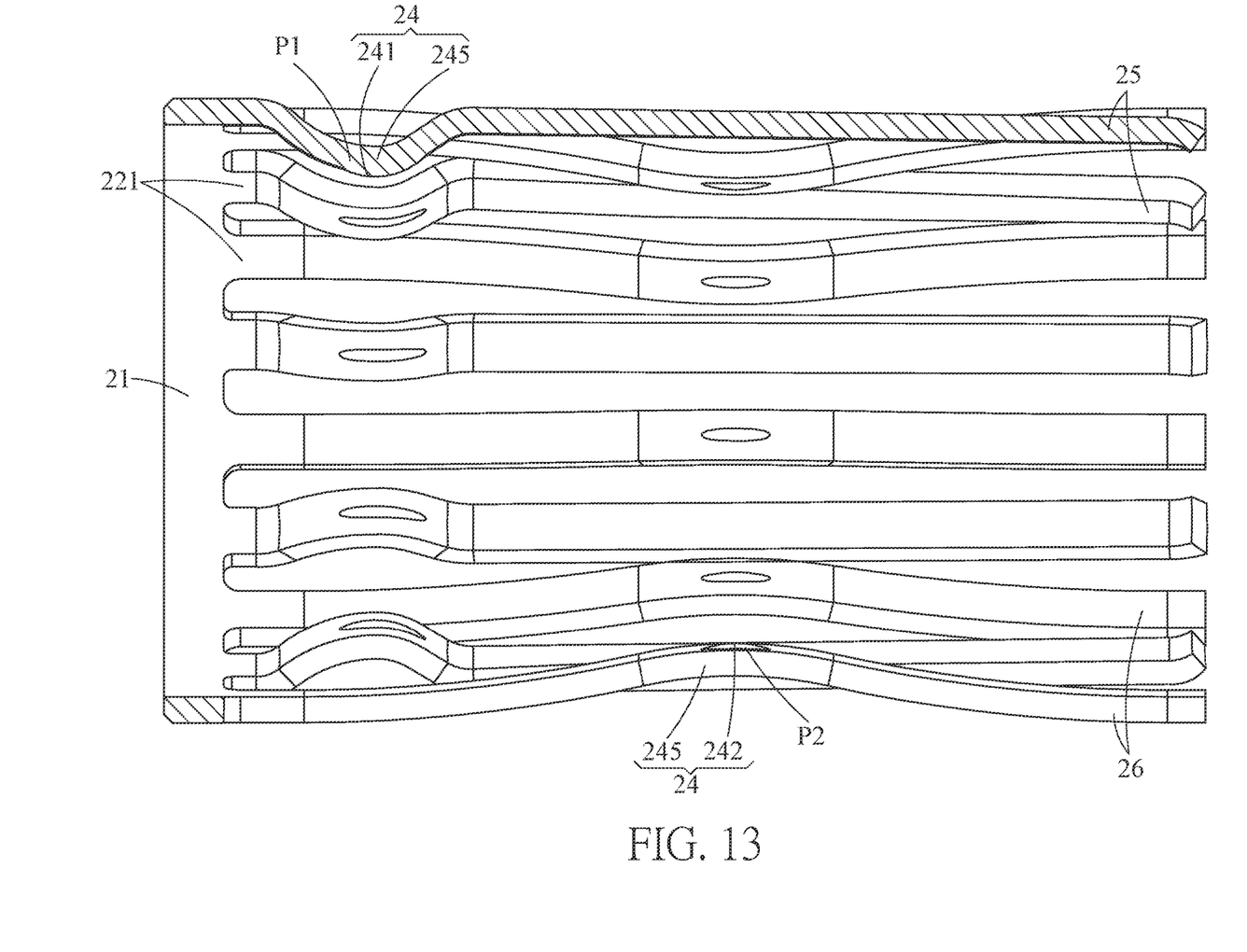
FIG. 13 illustrates a side schematic view of a lamella cage of a power connector according to a fourth embodiment of the instant disclosure.

In this embodiment, more specifically, the contact lamellae 22 comprise a plurality of long suspension arms 26 (long claws) and a plurality of short suspension arms 25 (short claws), and the length of the long suspension arm 26 is greater than the length of the short suspension arm 25, but embodiments are not limited thereto. In some embodiments, the lengths of the contact lamellae 22 may be the same; that is, all the contact lamellae 22 may be of the configuration of the short suspension arm 25 (short claws) or may be of the configuration of the long suspension arm 26 (long claws), as shown in FIGS. 12 and 13, respectively.

In this embodiment, more specifically, the short suspension arms 25 and the long suspension arms 26 are spacedly arranged on the side portion of the ring portion 21. Furthermore, the short suspension arms 25 and the long suspension arms 26 are alternately arranged on the side portion of the ring portion 21 to form a circular array.

In this embodiment, more specifically, each of the contact portions 24 is located on the contact lamella 22 of the lamella cage 2 by a range from one-fifth of the entire length of the lamella cage 2 to one-second of the entire length of the lamella cage 2. Particularly, in one or some embodiments, the length of the short suspension arm 25 (short claw) is 10 mm, and the position of the contact portion 24 on the short suspension arm 25 (short claw) may be 1 mm to 10 mm, with respect to the ring portion 21 of the lamella cage 2; for example, the position of the contact portion 24 on the short suspension arm 25 (short claw) may be 5 mm, 6 mm, 7 mm, or 8 mm, with respect to the ring portion 21 of the lamella cage 2. Supposed that the length of the lamella cage known to the inventor is 20 mm, the shortest contact position of the lamella cage (the contact for the insertion of the electrical plug connector) may be 10 mm, with respect to the ring portion of the lamella cage. Namely, for the lamella cage known to the inventor, the contact position is located at a middle portion of the contact lamella.

Figure 8:
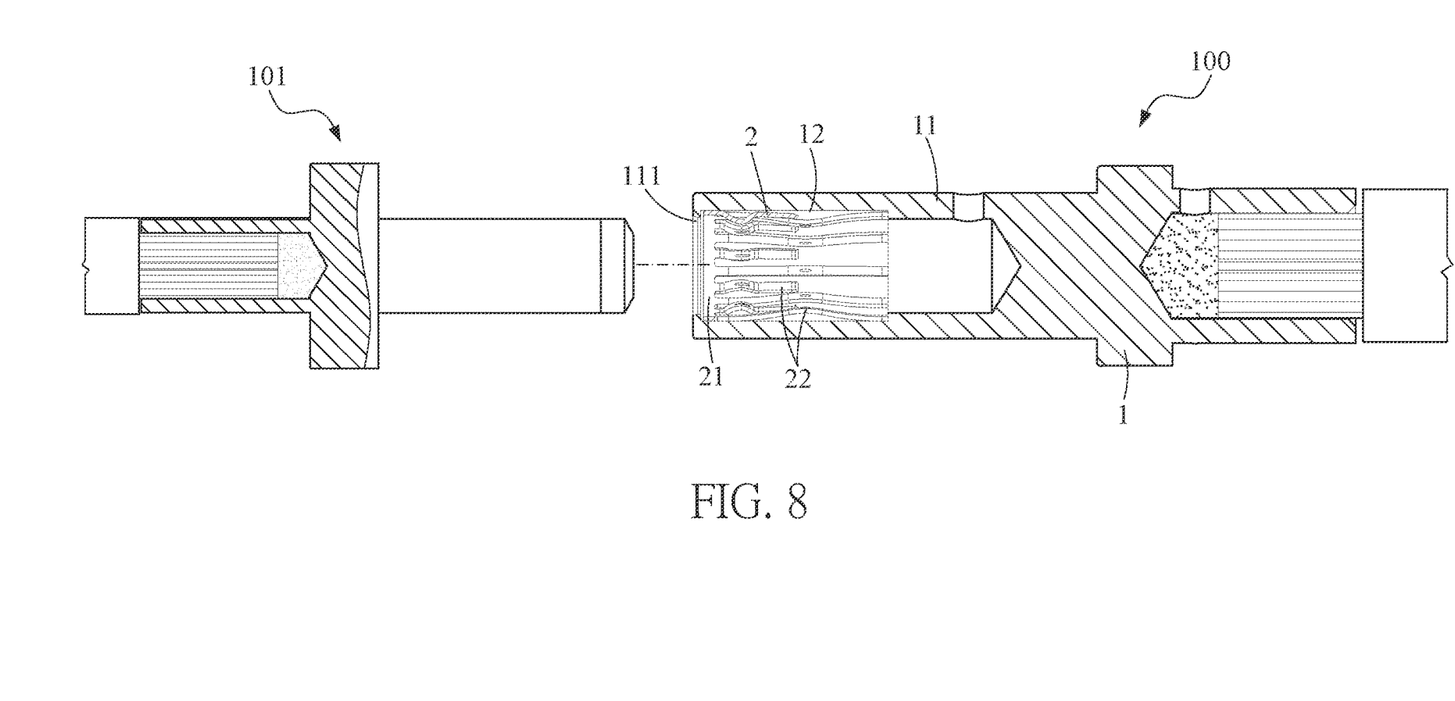
FIG. 8 illustrates a side schematic view showing that the power connector of the first embodiment is to be mated with an electrical plug connector.
Figure 9:
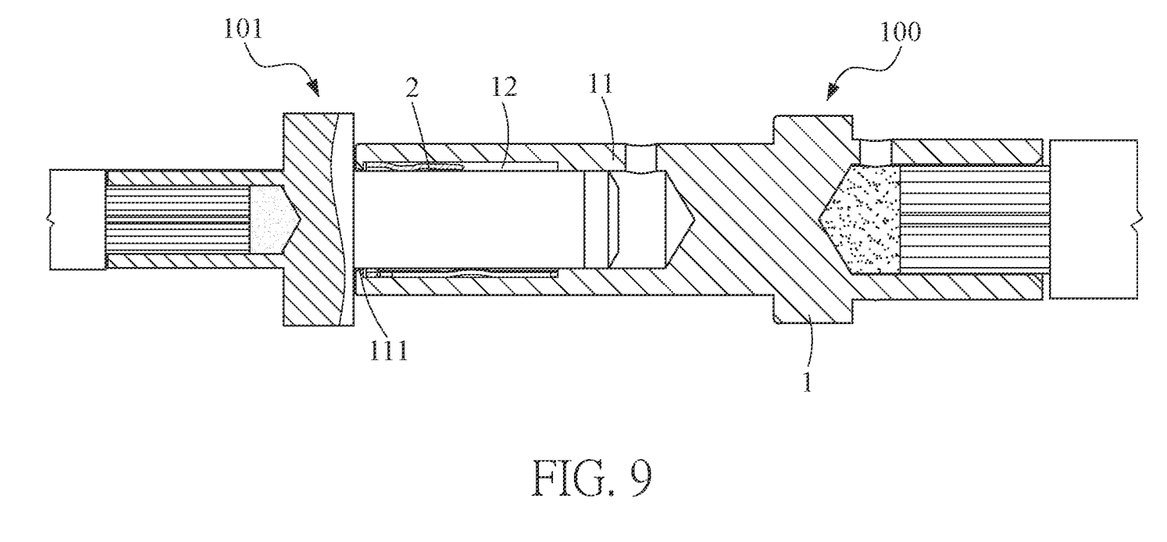
FIG. 9 illustrates a side schematic view showing that the power connector of the first embodiment is mated with an electrical plug connector.
Figure 10:
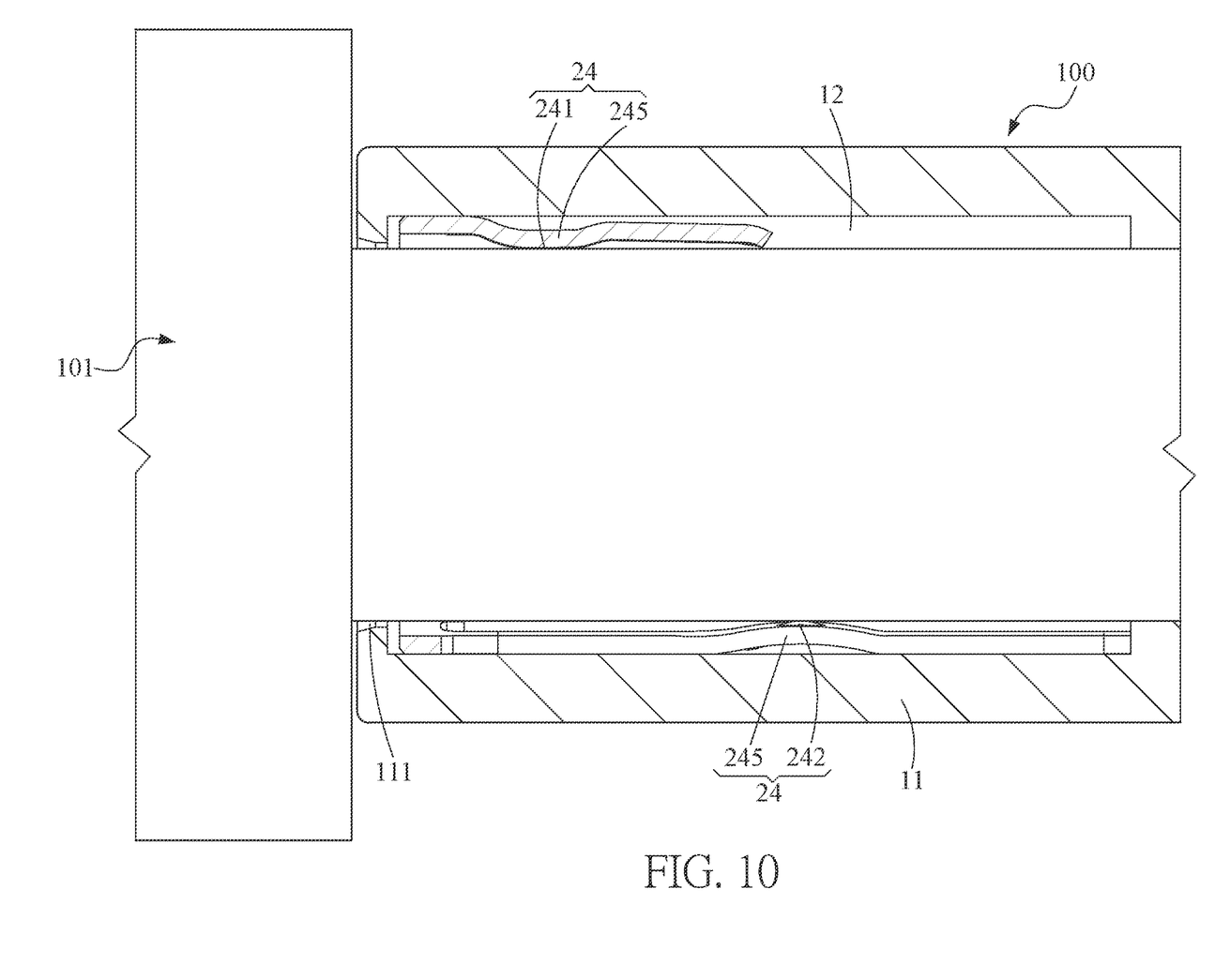
FIG. 10 illustrates an enlarged partial view of FIG. 9.

In this embodiment, more specifically, the position of the contact portion 24 on the short suspension arm 25, that is, as shown in FIGS. 8 to 10, the contact for the insertion of the electrical plug connector 101) may be adjusted freely, and the contact portion 24 may be moved forwardly to be adjacent to the opening 111 of the socket 11 (namely, as soon as the electrical plug connector 101 is inserted into the socket 11, the electrical plug connector 101 contacts the contact portion 24). Hence, the contact timing for the contact between the electrical plug connector 101 and the contact portion 24 can be brought forward. Accordingly, in this embodiment, as soon as the electrical plug connector 101 is inserted into the socket 11, the electrical plug connector 101 contacts the contact portion 24 for grounding, thereby preventing personnel from having electric shock upon the personnel contacting the housing without grounding treatment.

In this embodiment, more specifically, the contact portions 24 comprise a plurality of first contacts 241 and a plurality of second contacts 242. The first contacts 241 may be, but not limited to, at the first positions P1 of the short suspension arms 25. The second contacts 242 may be, but not limited to, at the second positions P2 of the long suspension arms 26.

In some embodiments, the first contact 241 and the second contact 242 (the contact point) may be moved forwardly to a same position. For example, the first contact 241 and the second contact 242 may be adjacent to the opening 111 of the socket 11, e.g., may be at the first position P1. In this embodiment, a lamella cage 2 having a plurality of first contacts 241 at different positions may be provided, and the lamella cage 2 can be replaced with another lamella cage 2 having a plurality of first contacts 241 at different positions according to requirements. Therefore, for users having requirements in different contact distances, electrical plug connectors 101 with insertion pins in different lengths can be used.

In this embodiment, more specifically, each of the contact portions 24 comprises a protruding portion 245, and the protruding portion 245 bends and protrudes toward a center point Q of the socket 11 from the contact lamella 22. The orientation of the protruding portions 245 of the first contacts 241 for contacting the insertion pin of the electrical plug connector 101 may be adjusted to be flat or stiff, so that the mating/unmating force can be controlled properly. Hence, the force for inserting the insertion pin of the electrical plug connector 101 into the receptacle connector (the mating force) is smaller, while the force for pulling the insertion pin of the electrical plug connector 101 out of the receptacle connector (the unmating force) is larger.

In this embodiment, more specifically, a first contact timing of the lamella cage 2 corresponds to the distance between the opening 111 of the socket 11 and the first contact 241 (the contact portion 24 on the first position P1), and a second contact timing of the lamella cage 2 corresponds to the distance between the first contact 241 and the second contact 242 (namely, in this embodiment, the distance between the contact portion 24 on the first position P1 and the contact portion 24 on the second position P2).

When the insertion pin of the electrical plug connector 101 is inserted into the socket 11 of the housing 1, the insertion pin of the electrical plug connector 101 contacts the contact portions 24 of the lamella cage 2 in different timings. Specifically, in this embodiment, the first contact timing is the contact time duration from that the insertion pin of the electrical plug connector 101 inserts into the socket 11 to that the insertion pin of the electrical plug connector 101 contacts the first contacts 241 of the short suspension arms 25. The second contact timing is the contact time duration from that the insertion pin of the electrical plug connector 101 contacts the first contacts 241 of the short suspension arms 25 to that, when the insertion pin of the electrical plug connector 101 is inserted into a deeper position inside the socket 11, the insertion pin of the electrical plug connector 101 further contacts the second contacts 242 of the long suspension arms 26.

The short suspension arms 25 and the long suspension anus 26 are respectively provided with the first contacts 241 and the second contacts 242 in different positions, thereby ensuring the contact between the insertion pin of the electrical plug connector 101 and the contact portions 24 of the lamella cage 2, thus preventing the insertion pin of the electrical plug connector 101 from detaching off the contact portion 24 of the lamella cage 2 or preventing the insertion pin of the electrical plug connector 101 from not contacting the contact portion 24 of the lamella cage 2. That is, the first contact 241 and the second contact 242 at different positions contact the outer peripheral surface of the insertion pin of the electrical plug connector 101. Accordingly, when one of the contacts (the first contact 241 or the second contact 242) is detached off or does not contact the insertion pin of the electrical plug connector 101, the other contact (the first contact 241 or the second contact 242) still closely contacts the insertion pin of the electrical plug connector 101.

The short suspension arm 25 and the long suspension arm 26 have different lengths and different moment arms. The short suspension arm 25 has a shorter moment arm, and the elastic force provided by the short suspension arm 25 for fixing the insertion pin of the electrical plug connector 101 is higher. Therefore, the short suspension arm 25 would be worn and damaged easily, as compared with the long suspension arm 26, Conversely, the long suspension arm 26 has a longer moment arm, and the elastic force provided by the long suspension arm 26 for fixing the insertion pin of the electrical plug connector 101 is lower. Accordingly, after the power connector is used for a long period of time, the short suspension arms 25 may be detached off or not contact the insertion pin of the electrical plug connector 101, while the long suspension arms 26 still contact the insertion pin of the electrical plug connector 101.

In this embodiment, more specifically, the housing 1 comprises an annular slot 12, and the annular slot 12 is formed as an inner wall of the socket 11. The ring portion 21 and the free ends 222 of the contact lamellae 22 of the lamella cage 2 are respectively abutted against two ends of the annular slot 12.

Figure 11:
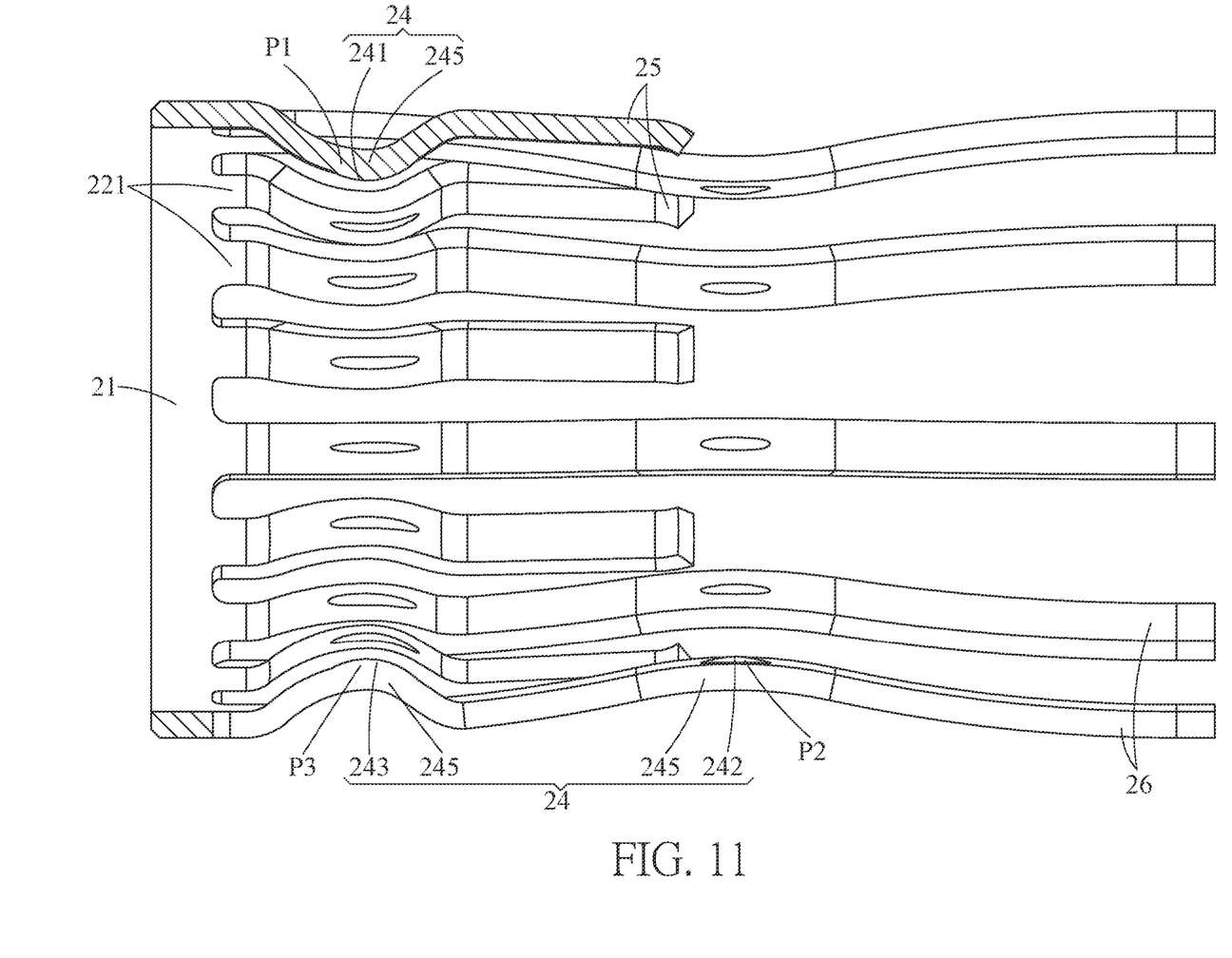
FIG. 11 illustrates a side schematic view of a lamella cage of a power connector according to a second embodiment of the instant disclosure.

Please refer to FIG. 11. A lamella cage according to a second embodiment of the instant disclosure is illustrated. FIG. 11 illustrates a side schematic view of a lamella cage of a power connector according to a second embodiment of the instant disclosure. In this embodiment, the contact portions 24 comprise a plurality of third contacts 243, and each of the third contacts 243 is on a third position P3 of the corresponding long suspension arm 26. Moreover, in this embodiment, the third position P3 may be correspond to the first position P1 or not correspond to the first position P1. That is, in this embodiment, the location of the third position P3 on the long suspension arm 26 may be the same as or different from the location of the first position P1 on the short suspension arm 25.

Please refer to FIGS. 12 and 13. lamella cages according to a third embodiment and a fourth embodiment of the instant disclosure are illustrated, respectively. FIG. 12 illustrates a side schematic view of a lamella cage of a power connector according to a third embodiment of the instant disclosure. FIG. 13 illustrates a side schematic view of a lamella cage of a power connector according to a fourth embodiment of the instant disclosure. In these embodiments, the contact lamellae may have the same length. More specifically, in the embodiment shown in FIG. 12, the contact lamellae 22 are configured to be the short suspension arms 25 (short claw); conversely, in the embodiment shown in FIG. 13, the contact lamellae 22 are configured to be the long suspension arms 26 (long claw). Furthermore, the first contacts 241 and the second contacts 242 at different positions are provided on the short suspension arms 25 and the long suspension arms 26, respectively.

In this embodiment, the end of the housing 1 opposite to the opening 111 of the housing 1 has a wire connection hole. The wire connection hole is filled with a conductive medium and is inserted by a power supply wire.

According to one or some embodiments of the instant disclosure, the position of the contact portion (contact) on the contact lamella of the lamella cage can be adjusted freely so as to meet insertion pins with different lengths. Moreover, the configuration of the protruding portion of the contact portion (contact) improves the reliability for being contacted by the insertion pin. Furthermore, since the orientation of the short suspension arm for contacting the insertion pin can be adjusted easily, the mating/unmating force can be controlled properly. Hence, the force for inserting the insertion pin into the receptacle connector (the mating force) is smaller, while the force for pulling the insertion pin out of the receptacle connector (the unmating force) is larger. Furthermore, by having the long suspension arms and the short suspension arms on the ring portion of the socket in an alternate configuration, the normal force for contacting the contact lamellae can be adjusted, thereby increasing the pluggable property and durability of the receptacle connector.

While the instant disclosure has been described by the way of example and in terms of the preferred embodiments, it is to be understood that the invention need not be limited to the disclosed embodiments. On the contrary, it is intended to cover various modifications and similar arrangements included within the spirit and scope of the appended claims, the scope of which should be accorded the broadest interpretation so as to encompass all such modifications and similar structures.

What is claimed is:

1. A power connector socket, comprising:
a housing comprising a socket and an opening at a side portion of the socket; and
a lamella cage passing through the socket, wherein the lamella cage comprises:
a ring portion adjacent to the opening; and
a plurality of contact lamellae outwardly extending from a side portion of the ring portion and annularly arranged, wherein one of two ends of each of the contact lamellae comprises a fixed end formed on the ring portion, and a free end outwardly extends from the other end of each of the contact lamellae; the contact lamellae comprise a plurality of contact portions extending toward an interior portion of the socket, the contact portions are on a first position adjacent to the fixed end of each of the contact lamellae and on a second position of a middle portion of each of the contact lamellae, and wherein the contact lamellae comprise a plurality of long suspension arms and a plurality of short suspension arms, the long suspension arms and the short suspension arms are alternately and spacedly arranged and extending outwardly from the side portion of the ring portion.

2. The power connector socket according to claim 1, wherein the contact portions comprise a plurality of first contacts and a plurality of second contacts, wherein the first contacts are at the first positions of the short suspension arms, and the second contacts are at the second positions of the long suspension arms.

3. The power connector socket according to claim 2, wherein the contact portions comprise a plurality of third contacts, each of the third contacts is on a third position of the corresponding long suspension arm.

4. The power connector socket according to claim 3, wherein the third position corresponds to the first position or does not correspond to the first position.

5. The power connector socket according to claim 1, wherein each of the contact portions comprises a protruding portion, each of the protruding portions bends and protrudes toward a center point of the socket from the corresponding contact lamella.

6. The power connector socket according to claim 1, wherein each of the contact portions is located at the lamella cage by a range from one-fifth of an entire length of the lamella cage to one-second of the entire length of the lamella cage.

7. The power connector socket according to claim 1, wherein lengths of the contact lamellae are the same.

8. The power connector socket according to claim 1, wherein a first contact timing of the lamella cage corresponds to a distance between the opening and the contact portion on the first position, and a second contact timing of the lamella cage corresponds to a distance between the contact portion on the first position and the contact portion on the second position.

9. The power connector socket according to claim 1, wherein the housing comprises an annular slot formed as an inner wall of the socket, the ring portion and the free ends of the contact lamellae are respectively abutted against two ends of the annular slot.

10. A power connector socket, comprising:
a housing comprising a socket and an opening at a side portion of the socket; and
a lamella cage passing through the socket, wherein the lamella cage comprises:
a ring portion adjacent to the opening; and
a plurality of contact lamellae outwardly extending from a side portion of the ring portion and annularly arranged, wherein one of two ends of each of the contact lamellae comprises a fixed end formed on the ring portion, and a free end outwardly extends from the other end of each of the contact lamellae; the contact lamellae comprise a plurality of contact portions extending toward an interior portion of the socket, the contact portions are on a first position adjacent to the fixed end of each of the contact lamellae and on a second position of a middle portion of each of the contact lamellae, wherein the contact lamellae comprise a plurality of long suspension arms and a plurality of short suspension arms, the long suspension arms and the short suspension arms are alternately and spacedly arranged and extending outwardly from the side portion of the ring portion; wherein the contact portions comprise a plurality of first contacts and a plurality of second contacts; and wherein the first contacts are at the first positions of the short suspension arms, and the second contacts are at the second positions of the long suspension arms.

11. The power connector socket according to claim 10, wherein the contact portions comprise a plurality of third contacts, each of the third contacts is on a third position of the corresponding long suspension arm.

12. The power connector socket according to claim 11, wherein the third position corresponds to the first position or does not correspond to the first position.

13. The power connector socket according to claim 10, wherein each of the contact portions comprises a protruding portion, each of the protruding portions bends and protrudes toward a center point of the socket from the corresponding contact lamella.

14. The power connector socket according to claim 10, wherein each of the contact portions is located at the lamella cage by a range from one-fifth of an entire length of the lamella cage to one-second of the entire length of the lamella cage.

15. The power connector socket according to claim 10, wherein lengths of the contact lamellae are the same.

16. The power connector socket according to claim 10, wherein a first contact timing of the lamella cage corresponds to a distance between the opening and the contact portion on the first position, and a second contact timing of the lamella cage corresponds to a distance between the contact portion on the first position and the contact portion on the second position.

17. The power connector socket according to claim 10, wherein the housing comprises an annular slot formed as an inner wall of the socket, the ring portion and the free ends of the contact lamellae are respectively abutted against two ends of the annular slot.

\* \* \* \* \*